Patented Dec. 15, 1942

2,305,113

UNITED STATES PATENT OFFICE 2,305,113

WATERPROOFING COMPOSITION FOR CONCRETE OR MORTAR

Edward W. Scripture, Jr., Shaker Heights, Ohio, assignor to The Master Builders Company, Cleveland, Ohio, a corporation of Ohio No Drawing. Application February 3, 1940, Serial No. 317,179

9 Claims. (Cl. 106—95)

This invention relates to the waterproofing of concrete and mortar, and structures or articles made therefrom, the essential ingredient of such concrete or mortar being an hydraulic cement.

Concrete or mortar is made from an hydraulic cement and aggregate mixed with sufficient water to produce a plastic mass, which can be molded or poured into the desired shape. When the hydraulic cement sets and hardens, it combines with some of the water used to make a placeable mix, but the water required even in relatively dry mixes for placeability is always considerably in excess of the amount of water which will combine with the cement, even under the most favorable conditions. When this excess water leaves the hardened cement mass at some time subsequent to placing, the space occupied by this excess water remains in the hardened mass in the form of voids and capillaries, so that on exposure to water, the concrete or mortar will be more or less absorptive and permeable. It is an object of this invention to provide means for decreasing the absorptive qualities of mortar and concrete.

Two general methods of making concrete and mortar more waterproof are known. One of these relies on the reduction of the amount of water required for placing the concrete or mortar. In so far as the excess water is reduced, it is obvious that the voids in the hardened mass will be reduced and the concrete rendered less absorptive and permeable. Many different means have been used for the reduction of the water required for placing concrete. These include mechanical devices, such as tamps, vibrators, and other machines which permit the compacting of a much less plastic mass than would otherwise be the case. Another means of reducing the excess water is that of removing this water after the concrete has been placed, and at the same time compacting the still plastic mass as by absorptive rollers or by application of a vacuum. Other means of reducing excess water in the concrete are of a physico-chemical nature and include the use of plasticizing or dispersing agents, which increase the fluidity of the mix for a given water content, or conversely decrease the water required for the necessary placeability. But, whatever device has been used to reduce the amount of excess water in the mix, it has never been possible to eliminate entirely the excess water, and consequently the concrete or mortar has remained more or less porous. This invention does not deal with a method of waterproofing which depends on the elimination or reduction of the excess water in the plastic mass, except in so far as some of the compositions of this invention may have an incidental beneficial effect by permitting some reduction in excess water.

Another method of producing more waterproof concrete or mortar depends on an entirely different principle. No attempt is made to reduce excess water to any significant extent, but a material which is itself water repellant is introduced into the mix. It is to be presumed that this water repellant material either deposits in the voids as a filler or combines with the cement at the surfaces of the voids, but whatever the mode of action of the water repellant material, its introduction results in reducing the tendency of the concrete to absorb water so that it becomes more waterproof. It is an object of this invention to provide compositions which are more effective and more economical for the introduction of water repellant materials into cement mixes.

For a water repellant material to be effective, it is necessary that it should be in such a form that it can be readily and uniformly distributed throughout the mix; that it shall be resonably permanent in the hardened mass; that it shall be effectively water repellant; and that it shall not have a deleterious effect on the strength of the cement. A large number of materials have been used or suggested for use as water repellants in concrete, including fats, fatty acids, paraffin, waxes, greases, acid sludge, rosin, mineral and vegetable oils, and others too numerous to mention. Most of these have lacked one or more of the qualifications of a satisfactory water repellant waterproofing, and it is now generally accepted that the most satisfactory waterproofing of this type is highly purified stearic acid, either in the form of stearic acid or as a stearate of an inorganic base, and in the proportions of 0.2% to 0.4% on the weight of the cement.

To introduce stearic acid or a stearate into a cement mix effectively, it is necessary that it be in such a form that it will distribute itself uniformly and easily throughout the mix. Many expedients for the solution of this problem have been suggested. One of the earliest and most successful was the preparation of the stearate in the form of a powdered calcium stearate, as set forth in Patent No. 851,247 to Newberry. It has also been proposed to introduce other metallic stearate, such as iron stearate described in Horn Patent No. 932,280, or ammonium stearate as in Horn Patent No. 1,088,02. Rosin or resinic acid has also been employed in the form of an ammonia soap, as described in Horn Patent No. 1,255,116.

Other soaps, such as those of sodium potassium and aluminum have also been proposed. The effect of these soaps is usually upon contact with the lime present in the cement to produce a double decomposition product yielding an insoluble calcium soap (ordinarily calcium stearate) and a soluble salt of sodium, or ammonium, or whatever base was employed to form the original soap, which latter obviously increases the amount of soluble material in the structure capable in the long run of producing efflorescence and possibly other deleterious effects.

Another procedure has been to grind prepared calcium stearate into the cement before use. All of these methods have some objection in the difficulty of securing uniform distribution, in the introduction of extraneous materials not necessary for the waterproofing effect which may exert a deleterious effect on the cement, or in making the cement more difficult to wet if the waterproofing is ground into the cement.

In my prior Patent No. 2,003,613 is described a method of waterproofing concrete, which employs a water emulsion of a soap forming fatty acid. Emulsions of other materials of a water repellant nature, such as paraffin, have also been used for waterproofing. These have the advantage that mixing with the cement is facilitated, that no extraneous substances are introduced, and that the concentration of the water repellant material in the composition is increased so that the decreased package, handling, shipping and storage costs make such a product more economical.

The objective of waterproofing compositions of the type described is to introduce into the cement mix and to distribute uniformly throughout that mix a water repellant material which will repel water from the capillary pores of the structure. To accomplish this purpose it is necessary that the water repellant material should be in a finely divided state, that it should mix readily with water, that it should introduce as small an amount as possible of extraneous materials with the cement mix, that it should not interfere with the hydration reactions of the cement or have a deleterious effect on the strength of the structure, and that it should after introduction into the mix become a permanent part of the cement structure. It is further desirable that the composition to be employed should be as concentrated as possible to reduce the costs of packaging, freight, handling and storage. It is further desirable that the composition should be of itself permanent and should have no tendency to separate or settle. Preferably, such a material should be in the form of a dry powder.

The introduction of a water repellant material into a cement mix in the manner described is entirely different from the application of a coating of water repellant material to the surface of a hardened cement structure. For the latter purpose, many methods have been proposed, such as the application of paraffin, aluminum stearate or other substance in solution to the surface, or such materials as paraffin, wax or the like, have been applied to the surface of the hardened structure by heating. These methods produce a film on the surface and fill the surface pores with the water repellant or water resistant material. At best, penetration of the material into the structure proceeds to only a very slight depth below the surface. Such applications alter the appearance of the surface and are only temporary because they are exposed at the surface to the destructive action of weathering and to wearing off by abrasion. If however, the water repellant material is introduced into the mix before hardening, it becomes an integral part of the mix and is distributed throughout the structure so that it has a permanent effect which is not affected either by the action of weathering or abrasion which attack the surface.

I have found that an integral waterproofing composition, which fulfills the requirements set forth above, can be procured by melting a normally solid meltable organic water-repellant material and atomizing the melted material in suitable apparatus, such as a paint spray. The water repellant material is melted and maintained at a temperature above its melting point while being forced by air pressure through a nozzle which breaks up the fluid water repellant material into fine particles or into a mist on leaving the nozzle. The fine particles of water repellant material are cooled in the air into which they are ejected to a point below their melting point and are collected in the form of a fine powder, having distinctive or characteristic shapes with comparatively smooth surfaces. Particles solidified in finely subdivided condition in a gas generally have the shape of spheres which may have been somewhat elongated by fluid friction. By using the type of nozzle in which the liquid to be atomized is mixed with air at the point of exit from the nozzle, an even finer subdivision of the water repellant material may be secured. With a given apparatus, finer particles are obtained with increased air pressure.

The finely divided powder produced, as described, can be mixed with water to form an emulsion and then added to the cement mix, or it may be added directly to the cement mix while it is being mixed, with the result that the pores of the cement structure are made water repellant.

I have found, however, that an even more effective waterproofing composition may be prepared by adding to the water repellant material, either before or after melting but before atomizing, a small amount of a suitable emulsifying agent, such as triethanolamine, morpholine, etc., or even soap, although the proportion of soap required for effective action is substantially greater than the proportion required of the more powerful emulsifying agents. I find that the product secured by atomizing a mixture of a water repellant substance with a small proportion of an emulsifying agent is more readily mixed with water, and can be more easily and more uniformly distributed in the cement mix with consequently greater effectiveness with respect to waterproofing, and with more beneficial effects on the strength of the structure.

As water repellant materials, I may use the relatively long chain solid water insoluble, organic compounds, including the solid long chain hydrocarbons, such as the solid paraffins or those having sixteen carbon atoms or more, the soap forming fatty acids or solid fatty acids having twelve carbon atoms or more, such as stearic acid, palmitic acid, etc., the solid water insoluble esters of these acids with the high atomic monohydric alcohols, including beeswax, carnauba wax, and other waxes. I may also use the waxy aromatic compounds, including the naphthyl chlorides which are solid at atmospheric temperatures, or other organic meltable water repellant compounds which are solid at atmospheric temperatures and which are insoluble in and substantially unaffected by water. The water repellant material should have a melting point above that of the atmospheric conditions to which it would be subjected prior to incorporation in the cement mix so that the finely divided atomized particles will not tend to coalesce or unite. This finely divided material may be packaged, shipped and stored in suitable paper or cloth bags and the like.

Preferably, water repellant compounds of the saturated series are employed as these have a less injurious effect on the hydration reactions of the cement or the compounds employed may be entirely inert, but I do not exclude the use of more or less unsaturated or reactive compounds in my compositions.

As emulsifying agents I may employ any one or a mixture of a number of suitable emulsifying agents well known in the art, such as triethanolamine, morpholine, ammonium linoleate, potassium abietate, soaps, etc.

In waterproofing a cement mix, it is customary to use from 0.2% of the water repellant material on the weight of the cement to about 0.4%. Less than this minimum is usually not very effective as a waterproofing, and more than this maximum is usually deleterious to the strength of the structure. I do not, however, limit my invention to this range because my composition being more effective may produce sufficient waterproofing effect for a particular purpose with a smaller proportion on the weight of the cement, and, being less injurious with respect to the strength of the structure, it may be used in greater proportions to produce more complete waterproofing.

Examples of my composition are as follows:

Example I

| | | |
|---|---|---|
| Stearic acid | grams | 200 |
| Triethanolamine | do | 10 |

These are melted together and sprayed through an atomizing nozzle into an atmosphere having a temperature substantially below the melting point of the composition. The product was collected as a fine powder which may be readily mixed into the cement.

Example II

| | | |
|---|---|---|
| Stearic acid | grams | 200 |
| Soap flakes | do | 15 |

These are melted together and sprayed through an atomizing nozzle in the same manner as the composition of Example I.

Example III

| | | |
|---|---|---|
| Paraffin | grams | 200 |
| Stearic acid | do | 20 |
| Triethanolamine | cubic centimeters | 10 |

These are melted together and sprayed through an atomizing nozzle as above to produce a powder having a particle size of the same order as the atomized spray, having the property of being readily miscible with wet mixes.

Example IV

| | | |
|---|---|---|
| Beeswax | grams | 200 |
| Stearic acid | do | 20 |
| Triethanolamine | cubic centimeters | 10 |

These are melted together and sprayed through an atomizing nozzle as above to produce a dry powder having fine particle size, and which may be readily mixed into dry cement or into concrete or mortar mixes, as desired.

The effects of the compositions of these examples on the compressive strengths of mortars when used in the proportions usually considered desirable for waterproofing were determined by preparing 2" x 4" mortar cylinders from a mortar consisting of one part cement to three parts sand by standard testing methods, and breaking these specimens in a compression testing machine after curing under standard conditions for three days, seven days and twenty-eight days.

In one series of tests, comparisons were made between a mortar without waterproofing addition and mortars with 0.3% of the weight of the cement of the waterproofing compositions of Examples I and II. In another series of tests, comparisons were made between a mortar without waterproofing addition and mortars with 0.3% of the weight of the cement of the compositions of Examples III and IV. In each case all the mortars were prepared with sufficient water to produce the same consistency. The results of these tests were as follows:

| Addition | Compressive strength—lbs./sq. in. | | |
|---|---|---|---|
| | 3 days | 7 days | 28 days |
| Series I: | | | |
| None | 2,354 | 4,548 | 6,360 |
| 0.3% composition Example I | 2,513 | 4,358 | 6,520 |
| 0.3% composition Example II | 2,164 | 4,072 | 6,298 |
| Series II: | | | |
| None | 2,290 | 4,262 | 6,202 |
| 0.3% composition Example III | 2,672 | 4,484 | 6,106 |
| 0.3% composition Example IV | 2,450 | 4,452 | 6,424 |

It will be seen that in no case do these compositions have an appreciable deleterious effect on the compressive strength as is the case with many waterproofing compositions, and in most cases the compressive strengths are actually increased by the addition of the waterproofing composition.

The effectiveness of the waterproofing secured with these compositions was determined by making up 2" x 4" mortar cylinders, as described for the compressive strength determinations. These specimens were cured under standard conditions for 7 days and then allowed to dry out in the air of the laboratory for 7 days. The specimens were weighed, placed upright in water to a depth of 1", and weighed at intervals over a period of 24 hours. The specimens were then totally immersed in water and again weighed after 1 hour and after 24 hours. The water absorbed by the specimens after each time interval was calculated as the percentage increase in weight of the specimen. In one series a comparison was made between a mortar without waterproofing addition, a mortar with the addition of a commercial stearate waterproofing paste used in such a proportion as to introduce 0.3% on the weight of the cement of stearic acid, and mortars with the additions of the compositions of Examples I and II in such proportions as to introduce a like percentage of stearic acid. The results of these tests were as follows:

*Percent absorption by weight*

| Addition | In water to depth of 1" | | | | Totally immersed | |
| --- | --- | --- | --- | --- | --- | --- |
| | ½ hr. | 1 hr. | 6 hrs. | 24 hrs. | 1 hr. | 24 hrs. |
| None | 0.4 | 0.5 | 0.9 | 1.0 | 2.5 | 4.0 |
| Commercial paste | 0.3 | 0.4 | 0.6 | 0.7 | 2.0 | 2.9 |
| Comp. Example I | 0.3 | 0.3 | 0.5 | 0.5 | 1.8 | 2.7 |
| Comp. Example II | 0.3 | 0.3 | 0.5 | 0.6 | 2.0 | 2.9 |

A second series with the compositions of Examples III and IV gave test results as follows:

*Percent absorption by weight*

| Addition | In water to depth of 1" | | | | Totally immersed | |
| --- | --- | --- | --- | --- | --- | --- |
| | ½ hr. | 1 hr. | 6 hrs. | 24 hrs. | 1 hr. | 24 hrs. |
| None | 0.3 | 0.3 | 0.6 | 0.8 | 1.8 | 2.8 |
| Commercial paste | 0.2 | 0.2 | 0.3 | 0.5 | 1.1 | 1.8 |
| Comp. Example III | 0.2 | 0.2 | 0.4 | 0.5 | 1.3 | 2.2 |
| Comp. Example IV | 0.2 | 0.2 | 0.4 | 0.5 | 1.2 | 2.2 |

It will be seen that the commercial paste and the compositions of the examples all produce substantial reductions in the tendency of the mortar to absorb water. The composition of Example I is more effective than the commercial paste, the composition of Example II is about as effective as the commercial paste, and the compositions of Examples III and IV are slightly less effective than the commercial paste.

It will be seen that the commercial paste and the compositions of the examples all produce substantial reductions in the tendency of the mortar to absorb water, and that the compositions of Examples I and II are about as effective as the commercial waterproofing paste.

The powder produced as described herein is in an atomized or finely divided, substantially dry condition. Having been solidified in air or a gas from finely subdivided or minute globules of molten material, the individual particles have generally curved surfaces and are usually of a spheroidal or somewhat elongated shape, whether the particles be the insoluble, water repellant, organic solid itself or such a solid in combination with a small percentage of emulsifying agent.

It will be apparent that the waterproofing compositions of my invention may be used in cement mixes in many different ways. The waterproofing composition may be mixed with any part of the mix, the aggregate, the cement, or the water prior to the making of the mix, or it may be added to the mix subsequent to the mixing together of all the other ingredients. Since these compositions are in the form of a dry powder, they may be mixed with the cement either at the time of manufacture of the cement, or at any subsequent time, or they may even be ground with the cement during its manufacture, or subsequently. Or the composition may be mixed with water to form a more or less concentrated emulsion which may either be added to the mix immediately or at some subsequent time. Furthermore, these waterproofing compositions may be mixed with other materials before addition to the mix, such as colorers, hardeners and other admixtures which it may be advantageous to use in the mix.

It will be apparent that the waterproofing compositions of the invention can be used with various substances which on occasion are added to concrete or mortar mixes, such as finely divided inert materials or finely divided pozzolanic materials as talc, pumice, fly ash, ground slag, diatomaceous earth or metallic aggregates as ground iron, or accelerators as calcium chloride, or retarders as calcium sulfate, or inorganic gelatinous colloids or cement plasticizing or dispersing agents. The waterproofing composition may be added to these various other materials, taken alone, or two or more combined, either at the time of preparing the concrete or mortar mix, or prior thereto, and the materials to which the waterproofing composition is added may be in the form of either a liquid or a dry powder.

It is to be understood that variations and modifications of the specific materials used herein and the particular procedure set forth may be made without departure from the spirit of this invention.

What I claim is:

1. A concrete or mortar mix comprising an hydraulic cement, water, and a very small quantity of finely divided, independent, particles of a water insoluble, water repellant, readily meltable organic solid having the generally spheroidal shape of particles of such material solidified in a gas from a finely subdivided molten condition.

2. A concrete or mortar mix comprising an hydraulic cement, water, and a very small quantity of finely divided, independent, particles of a water insoluble, water repellent, readily meltable, organic solid containing an emulsifying agent, the particles of said solid having the generally spheroidal shape of particles of such material solidified in a gas from a finely subdivided molten condition.

3. A concrete or mortar mix comprising an hydraulic cement, water, and a very small quantity of finely divided, independent particles of a meltable solid fatty acid, the particles of which have the general spheroidal shape of particles of such fatty acid solidified in the gas from a finely subdivided molten condition.

4. A concrete or mortar mix comprising an hydraulic cement, water, and a very small quantity of finely divided, independent particles of a meltable solid fatty acid containing an emulsifying agent, the particles of said solid having the general spheroidal shape of particles of such fatty acid solidified in the gas from a finely subdivided molten condition.

5. A concrete or mortar mix comprising an hydraulic cement, water, and a very small quantity of finely divided, independent particles of a meltable solid fatty acid containing morpholine, said particles having the generally spheroidal shape of particles of such material solidified in a gas from a finely subdivided molten condition.

6. As a new composition of matter, a dry cement having admixed therewith a very small quantity of finely divided, independent, particles of a water insoluble, water repellant, readily meltable organic solid having the generally spheroidal shape of particles of such material solidified in a gas from a finely subdivided molten condition.

7. As a new composition of matter, a dry cement having admixed therewith a very small quantity of finely divided, independent, particles of a water insoluble, water repellant, readily meltable, organic solid containing an emulsifying agent, the particles of said solid having the generally spheroidal shape of particles of such material solidified in a gas from a finely subdivided molten condition.

8. As a new composition of matter, a dry cement having admixed therewith a very small quantity of finely divided, independent, particles of a water insoluble, water repellant, readily meltable organic solid having at least 16 carbon atoms and having the generally spheroidal shape of particles of such material solidified in a gas from a finely subdivided molten condition.

9. As a new composition of matter, a dry cement having admixed therewith a very small quantity of finely divided, independent particles of a meltable solid fatty acid containing an emulsifying agent, the particles of said solid having the general spheroidal shape of particles of such fatty acid solidified in the gas from a finely subdivided molten condition, said particles containing morpholine.

EDWARD W. SCRIPTURE, Jr.